US012523961B2

(12) United States Patent
Sato et al.

(10) Patent No.: US 12,523,961 B2
(45) Date of Patent: Jan. 13, 2026

(54) ELECTROPHOTOGRAPHIC CLEANING BLADE, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Kana Sato, Shizuoka (JP); Ryo Ogawa, Kanagawa (JP); Masahiro Watanabe, Shizuoka (JP); Takayuki Hiratani, Tokyo (JP); Tetsuo Hino, Kanagawa (JP); Masaki Tsunoda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 630 days.

(21) Appl. No.: 17/822,723

(22) Filed: Aug. 26, 2022

(65) Prior Publication Data

US 2023/0095958 A1 Mar. 30, 2023

(30) Foreign Application Priority Data

Aug. 31, 2021 (JP) ................................ 2021-141901

(51) Int. Cl.
*G03G 21/00* (2006.01)
*G03G 15/16* (2006.01)

(52) U.S. Cl.
CPC ....... *G03G 21/0017* (2013.01); *G03G 15/161* (2013.01); *G03G 2215/1661* (2013.01)

(58) Field of Classification Search
CPC ............ G03G 21/0017; G03G 15/161; G03G 2215/1661
See application file for complete search history.

(56) References Cited

U.S. PATENT DOCUMENTS

2017/0038724 A1 2/2017 Shimizu
2019/0278212 A1* 9/2019 Sakuda ............. G03G 21/0017
2020/0292954 A1 9/2020 Aoyama

FOREIGN PATENT DOCUMENTS

| | | | |
|---|---|---|---|
| CN | 101528604 | A | 9/2009 |
| CN | 105121502 | A | 12/2015 |
| CN | 105319926 | A | 2/2016 |
| JP | H0611464 | A | 1/1994 |
| JP | 2010134310 | A | 6/2010 |

(Continued)

*Primary Examiner* — Shane Fang
(74) *Attorney, Agent, or Firm* — Canon U.S.A., Inc., IP Division

(57) ABSTRACT

Provided is a cleaning blade including: an elastic member containing a polyurethane; and a supporting member configured to support the elastic member. The polyurethane has a linear moiety represented by $-(CH_2)m-$. The elastic member has a plate shape having a main surface and a distal end surface forming a distal end-side edge with the main surface, at least on a distal end side. Martens hardness at positions on a bisector at intervals of 30 μm from a distal end-side edge to a position furthest away from the distal end-side edge by 100 μm decreases from a distal end-side edge to the position. A Martens hardness HM1 of the elastic member at a position P1 is 1.0 N/mm$^2$ or more. The elastic layer satisfies $K\omega_1 > K\omega_2 > K\omega_3$. Further, the cleaning blade has an erosion rate E of 0.6 μm/g or less.

8 Claims, 7 Drawing Sheets

(56) References Cited

FOREIGN PATENT DOCUMENTS

| | | | |
|---|---|---|---|
| JP | 2012027212 | A | 2/2012 |
| JP | 2016029449 | A | 3/2016 |
| JP | 2018072806 | A | 5/2018 |
| JP | 2019023672 | A | 2/2019 |
| JP | 2021092756 | A | 6/2021 |
| WO | 2015030120 | A1 | 3/2017 |

* cited by examiner

ELECTROPHOTOGRAPHIC CLEANING BLADE, PROCESS CARTRIDGE, AND ELECTROPHOTOGRAPHIC IMAGE FORMING APPARATUS

BACKGROUND

Technical Field

The present disclosure relates to an electrophotographic cleaning blade, a process cartridge, and an electrophotographic image forming apparatus.

Description of the Related Art

In an electrophotographic image forming apparatus, a cleaning blade is arranged in order to remove toner remaining on an image-bearing member, such as a photosensitive drum, a transfer belt, or an intermediate transfer member. In addition, as the cleaning blade, frequent use is made of a cleaning blade in which at least an abutting portion with the image-bearing member contains a thermosetting polyurethane elastomer. The reason for this is that the thermosetting polyurethane elastomer can plastically deform and is excellent in wear resistance.

In recent years, because of a demand for a further increase in image quality of an electrophotographic image, a further reduction in particle diameter of toner has been promoted. Accordingly, the cleaning blade to be used for removing the toner remaining on the image-bearing member has been required to be further improved in cleaning performance so as to be capable of stably removing even a toner having a small particle diameter. For that purpose, for example, there is a proposal that a hardness of the abutting portion of the cleaning blade be increased to increase an abutting pressure on the image-bearing member as a member to be cleaned. When the hardness of the abutting portion is increased, a contact width with the image-bearing member can be reduced. As a result, the abutting pressure can be increased, and hence a cleaning property for the toner having a small particle diameter can be improved.

In addition, in Japanese Patent Application Laid-Open No. 2010-134310, there is a proposal of a cleaning blade in which an increase in hardness of the abutting portion is achieved while an inside of the cleaning blade is kept flexible, by impregnating a urethane rubber with an isocyanate compound from its surface, and allowing the urethane rubber and the isocyanate compound to react with each other.

However, when the cleaning blade according to Japanese Patent Application Laid-Open No. 2010-134310 is used over a long period of time, fine chipping may occur in its abutting portion in some cases. As a result, its abutting state with the member serving as an abutting object (member to be cleaned) may become unstable and allow the toner to escape, leading to occurrence of a streaked image in some cases.

SUMMARY

At least one aspect of the present disclosure is directed to providing an electrophotographic cleaning blade, which can stably exhibit excellent cleaning performance even when used over a long period of time.

In addition, other aspects of the present disclosure are directed to providing a process cartridge and an electrophotographic image forming apparatus each including the above-mentioned cleaning blade.

According to one aspect of the present disclosure, there is provided an electrophotographic cleaning blade including: an elastic member containing a polyurethane; and a supporting member configured to support the elastic member, the electrophotographic cleaning blade being configured to clean a surface of a member to be cleaned, which is in motion, by bringing part of the elastic member into abutment with the surface of the member to be cleaned. The polyurethane has a linear moiety represented by $-(CH_2)m-$, where "m" is an integer of 4 or more. When a side of the cleaning blade to be brought into abutment with the surface of the member to be cleaned is defined as a distal end side of the cleaning blade, the elastic member has a plate shape having a main surface facing the member to be cleaned, and a distal end surface forming a distal end-side edge with the main surface, at least on the distal end side. When a first line segment is drawn on the distal end surface so that the first line segment is parallel to the distal end-side edge at a distance of 10 μm from the distal end-side edge, and when: a length of the first line segment is represented by L; a point on the first line segment at ½L from one end side in a longitudinal direction of the elastic member is represented by P1; a Martens hardness of the elastic member measured at a position of the point P1 is represented by HM1; and a bisector of an angle formed by the main surface and the distal end surface is drawn on a cross-section of the elastic member orthogonal to the distal end surface including the point P1 and the distal end-side edge, and Martens hardness at positions on the bisector at intervals of 30 μm from the distal end-side edge to a position furthest away from the distal end-side edge by 100 μm are measured, the Martens hardness at the respective positions decreases from the distal end-side edge to the position furthest away from the distal end-side edge by 100 μm, the HM1 is 1.0 $N/mm^2$ or more. Further, with regard to an index value Kω determined by the following equation (1) from a scattering profile obtained by allowing a characteristic X-ray from a Cu tube to enter a surface region to be evaluated of the cleaning blade including the point P1 at an incidence angle ω, $K\omega_1>K\omega_2>K\omega_3$ is satisfied, where $K\omega_1$ represents the index value at $\omega_1=0.5°$, $K\omega_2$ represents the index value at $\omega_2=1.0°$, and $K\omega_3$ represents the index value at $\omega_3=3.0°$:

$$K\omega=[I_c/(I_c+I_a)]\times 100 \quad (1)$$

where $I_c$ represents a peak area value at $2\theta=21.0°$ in the scattering profile, and $I_a$ represents a peak area value at $2\theta=20.2°$ in the scattering profile, and wherein the cleaning blade has an erosion rate E of 0.6 μm/g or less, which is measured on the surface region to be evaluated using spherical alumina particles having an average particle diameter (D50) of 3.0 μm.

In addition, according to another aspect of the present disclosure, there is provided a process cartridge including the electrophotographic cleaning blade.

Further, according to another aspect of the present disclosure, there is provided an electrophotographic image forming apparatus including the electrophotographic cleaning blade.

Further features of the present disclosure will become apparent from the following description of exemplary embodiments with reference to the attached drawings.

DESCRIPTION OF THE EMBODIMENTS

In this disclosure, the description "XX to YY" representing a numerical range means a numerical range including a lower limit and an upper limit that are end points unless otherwise stated. Further, when the numerical ranges are described in a stepwise manner, the upper and lower limits of each numerical range may be arbitrarily combined.

As a member to be cleaned to which an electrophotographic cleaning blade (hereinafter sometimes referred to simply as "cleaning blade") according to one aspect of the present disclosure is applied, there are given, for example, an image-bearing member such as a photosensitive member, and an endless belt such as an intermediate transfer belt. A cleaning blade according to an embodiment of one aspect of the present disclosure is described in detail below by taking as an example a case in which the member to be cleaned is the image-bearing member. The present disclosure is not limited to the example in which the member to be cleaned is the image-bearing member.

<Configuration of Cleaning Blade>

Figure 1:
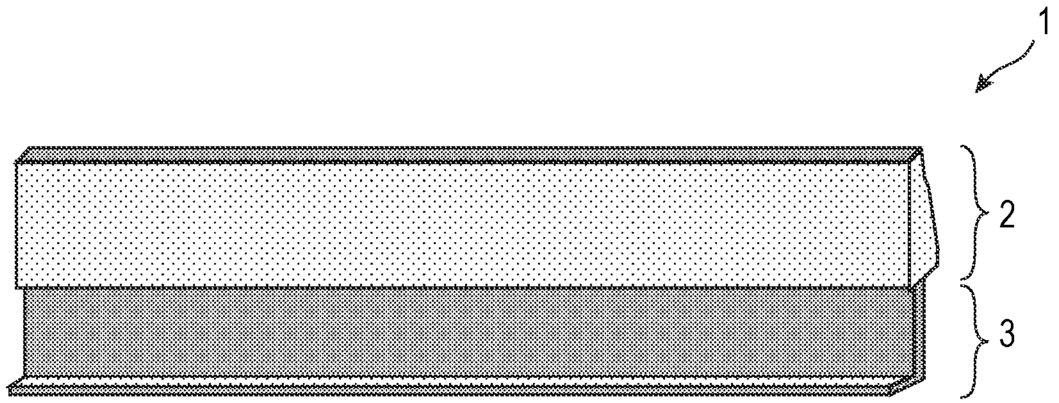
FIG. 1 is a schematic perspective view of an electrophotographic cleaning blade according to one aspect of the present disclosure.

FIG. 1 is a schematic perspective view of a cleaning blade 1 according to one aspect of the present disclosure. The cleaning blade 1 includes an elastic member 2 and a supporting member 3 configured to support the elastic member 2.

Figure 2:
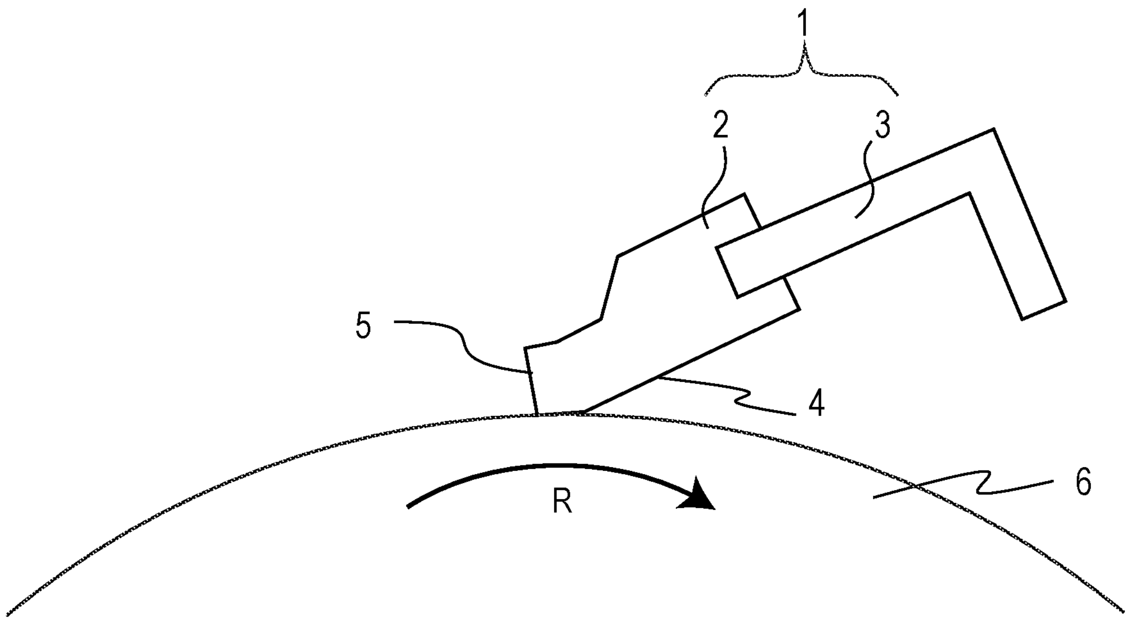
FIG. 2 is a view for illustrating a state in which the edge of the cleaning blade is brought into abutment with a member to be cleaned at a time when a process cartridge is at rest.

FIG. 2 is an example of a schematic illustration of the state of a cross-section in which the cleaning blade according to one aspect of the present disclosure is brought into contact with the member to be cleaned. The elastic member 2 has a plate shape having a main surface 4 and a distal end surface 5. The main surface 4 is a surface facing a member 6 to be cleaned. The distal end surface 5 is a surface that, when the side of the cleaning blade to be brought into abutment with the surface of the member 6 to be cleaned is defined as a distal end side, forms a distal end-side edge with the main surface 4 on the distal end side. R indicates the rotation direction of the member to be cleaned. Part of the elastic member 2 is brought into abutment with the surface of the member 6 to be cleaned, which is in motion, to clean the surface of the member 6 to be cleaned.

The inventors have found that, for example, a cleaning blade of an aspect described below is excellent in chipping resistance and keeps exhibiting excellent cleaning performance even when used for a long period of time.

That is, the cleaning blade according to one aspect of the present disclosure includes an elastic member containing a polyurethane, and a supporting member configured to support the elastic member.

The polyurethane has a linear moiety represented by $-(CH_2)m-$, where "m" is an integer of 4 or more.

A side of the cleaning blade to be brought into abutment with the surface of the member to be cleaned is defined as a distal end side of the cleaning blade, and it is assumed that a first line segment is drawn on the distal end surface of the elastic member so that the first line segment is parallel to the distal end-side edge at a distance of 10 μm from the distal end-side edge.

In addition, when: a length of the first line segment is represented by L; a point on the first line segment at a distance of ½L from one end side in a longitudinal direction of the elastic member is represented by P1; a Martens hardness of the elastic member measured at a position of the P1 is represented by HM1; and a bisector of an angle formed by the main surface and the distal end surface is drawn on a cross-section of the elastic member orthogonal to the distal end surface including the P1 and the distal end-side edge, and Martens hardnesses at positions on the bisector at intervals of 30 μm from the distal end-side edge to a position furthest away from the distal end-side edge by 100 μm are measured, the Martens hardnesses at the respective positions are gradually decreased from the distal end-side edge to the position furthest away from the distal end-side edge by 100 μm.

In addition, the HM1 is 1.0 $N/mm^2$ or more.

Further, with regard to an index value Kω determined by the following equation (1) from a scattering profile obtained by allowing a characteristic X-ray from a Cu tube to enter a surface region to be evaluated of the cleaning blade including the point P1 at an incidence angle ω, $K\omega_1>K\omega_2>K\omega_3$ is satisfied, where $K\omega_1$ represents the index value at $\omega_1=0.5°$, $K\omega_2$ represents the index value at $\omega_2=1.0°$, and $K\omega_3$ represents the index value at (03=3.0°:

$$K\omega=[I_c/(I_c+I_a)]\times 100 \quad (1)$$

where $I_c$ represents a peak area value at 2θ=21.0° in the scattering profile, and $I_a$ represents a peak area value at 2θ=20.2° in the scattering profile.

Further, the cleaning blade has an erosion rate E of 0.6 μm/g or less, which is measured on the surface region to be evaluated using spherical alumina particles having an average particle diameter (D50) of 3.0 μm.

The hardness of the elastic member is gradually decreased with increasing distance from its surface. Accordingly, a stress due to abutment can be dispersed. In addition, an interface such as a boundary between a high-hardness layer and a non-hardness layer is not present inside the elastic member, and hence interfacial peeling between layers does not occur. Further, the inside has a low hardness as compared to the outermost surface, and hence, as compared to a case in which the inside also has a high hardness like the outermost surface, followability to the surface of the image-bearing member is good, and hence excellent cleaning performance can be exhibited.

The Martens hardness of the outermost surface of the elastic member is preferably 1.0 to 5.0 $N/mm^2$. When the Martens hardness of the outermost surface is 1.0 $N/mm^2$ or more, the elastic member can abut on a photosensitive drum with a high abutting pressure, and when the Martens hardness is 5.0 $N/mm^2$ or less, the elastic member can flexibly abut on the photosensitive drum even under a state in which streak-like unevenness is formed on the photosensitive drum when used over a long period of time. As a result, the occurrence of a cleaning failure can be suppressed.

The erosion rate E is a value calculated through a micro slurry-jet erosion (MSE) test. The MSE test involves jetting fine particles each having approximately the same diameter as toner onto a cleaning blade in a pulsed manner, and calculating the erosion rate from the eroded depth of the cleaning blade at the portion onto which the fine particles have been jetted and the jet amount of the fine particles. The erosion rate E indicates an eroded depth per unit jet amount, and is a parameter indicating the brittleness of an object to be evaluated. That is, a larger value of the erosion rate E indicates that the object to be evaluated is more brittle. Accordingly, a cleaning blade having a large erosion rate E is liable to suffer the occurrence of fine chipping when used over a long period of time.

In general, polyurethane tends to become more brittle as its hardness is increased. However, the elastic member according to the present disclosure, despite having an increased hardness as compared to the related art, has a small parameter indicating brittleness calculated through the MSE test. That is, the elastic member is not brittle despite having a high hardness.

In addition, the MSE test allows a cleaning blade to be hypothetically measured for its accelerated endurance performance in an electrophotographic apparatus. When the erosion rate E measured using spherical alumina particles having an average particle diameter (D50) of 3.0 μm is 0.6 μm/g or less, the cleaning blade has sufficient strength required of a cleaning blade. That is, brittle fracture hardly occurs. Accordingly, even at the time of long-term use, the occurrence of chipping is reduced, and hence the occurrence of a cleaning failure due to chipping can be suppressed. When the erosion rate E is 0.6 μm/g or less, even in the case of use over a long period of time, fine chipping hardly occurs on the surface of the blade. Further, an erosion rate E of 0.5 μm/g or less is more preferred because the cleaning blade is strong against wear and can suppress the occurrence of fine chipping.

The MSE test may be performed using, for example, MSE-A Type Tester (Palmeso Co., Ltd.).

Next, the index value Kω is a value calculated by a grazing incidence X-ray method described below. According to the grazing incidence X-ray method, information on sites at different depths from a surface can be obtained through measurement with the incidence angle of an X-ray being minutely changed, and information on a deeper portion can be obtained by increasing the incidence angle. When measurement is performed with the incidence angle being changed from 0.5 to 3°, structural information at a depth of 10 to 65 μm can be obtained with a characteristic X-ray from a Cu tube. With use of the structural information obtained at each depth, the index value Kω of crystallinity is calculated from an area ratio between a crystal peak and an amorphous peak. A larger Kω indicates a higher crystallinity (a larger amount of a crystal component).

The elastic member according to the present disclosure satisfies $K\omega_1 > K\omega_2 > K\omega_3$, where $K\omega_1$, $K\omega_2$, and $K\omega_3$ represent respective K values calculated when, with regard to an index value Kω determined by the equation (1) from a scattering profile obtained by allowing a characteristic X-ray from a Cu tube to enter a surface region to be evaluated at an incidence angle ω, the incidence angle is set to $\omega_1=0.5°$, $\omega_2=1°$, and $\omega_3=3°$, respectively. This indicates that the elastic member is in a state in which its crystallinity is highest at the outermost surface, and the crystallinity gradually becomes lower toward the inside (in the depth direction from the surface).

By virtue of being in the state in which the crystallinity gradually becomes lower toward the inside, the elastic member achieves such a structure that the surface is appropriately hard and the inside maintains flexibility.

The various physical properties of the elastic member described above are expressed conceivably because the polyurethane contained in the elastic member has a crystal structure due to orientation of the main chain moiety of a polyol having the linear moiety represented by $-(CH_2)m-$ ("m" is an integer of 4 or more). A polyol to be used as a raw material preferably has a repeating structural unit represented by the following chemical formula (1), and the resultant polyurethane also preferably has a structure represented by the following chemical formula (1).

The polyurethane having such repeating structural unit can more easily crystallize by virtue of an intermolecular force acting between the $R_1$ and $R_2$ moieties in the polyol structures adjacent to each other. The polyurethane preferably has two or more kinds of structural units each represented by the following chemical formula (1).

Chemical formula (1)

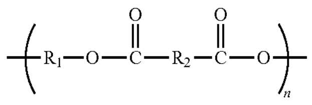

In the chemical formula (1), $R_1$ and $R_2$ each represent a linear divalent hydrocarbon group having 4 to 10 carbon atoms, and $R_1$ and $R_2$ may be identical to or different from each other. "n" is an integer of 1 or more.

In the elastic member according to the present disclosure, the crystal structure formed due to the orientation of the main chain moiety of the polyol of $-(CH_2)m-$("m" is an integer of 4 or more) of the polyurethane is more developed on the surface side. In other words, the degree of development of the crystal structure becomes smaller from the surface side toward the inside.

A portion where the crystal structure is more developed has a higher hardness, and as the degree of development of the crystal structure becomes smaller, the hardness becomes lower. In addition, in the elastic member according to the present disclosure, the degree of development of the crystal structure becomes smaller from the surface toward the inside, and hence the hardness is continuously reduced from the surface toward the inside. Consequently, the cleaning blade according to the present disclosure can achieve both of a high abutting pressure on the image-bearing member and excellent followability to the image-bearing member. As a result, the cleaning blade according to the present disclosure hardly causes a cleaning failure. In addition, in the elastic member according to the present disclosure, unlike a cleaning blade having a multilayer structure formed of a low-hardness layer and a high-hardness layer, there is no interface between a low-hardness layer and a high-hardness layer on the inside, and hence interlayer peeling does not occur even in long-term use.

In addition, in a cured layer formed through impregnation with an isocyanate compound, which is disclosed in Japanese Patent Application Laid-Open No. 2010-134310, an aggregated hard segment is present. Accordingly, when a stress is applied to a cleaning blade including the cured layer, chipping may occur in its distal end portion owing to the falling-off of the hard segment. Meanwhile, in the elastic member according to the present disclosure, there is formed a high-hardness region because the polyurethane has a crystal structure in which main chains of the polyol represented by $-(CH_2)m-$ ("m" is an integer of 4 or more) are oriented through an intermolecular force therebetween. Accordingly, the elastic member is excellent in impact-absorbing property, and hardly suffers the occurrence of chipping even by a microstress applied due to unevenness in hardness of toner or the photosensitive drum even when used over a long period of time.

The structure of the chemical formula (1) may be determined using a mass spectrometer of a direct sample introduction system involving ionizing a sample molecule.

Specifically, M2/M1 is preferably 0.0001 to 0.1000, where M1 represents a detection amount of all ions when a sample to be sampled is heated to be vaporized in an ionization chamber, and is heated at a temperature increase rate of 10° C./s to 1,000° C. through use of a mass spectrometer of a direct sample introduction system involving ionizing a sample molecule, and M2 represents an integral intensity of a peak of an extracted ion thermogram corresponding to an m/z value derived from the chemical formula (1). When the structure of the chemical formula (1) is contained within this range, the crystal structure of the surface can be more reliably formed.

[Elastic Member]

The polyurethane (polyurethane elastomer) for forming the elastic member according to the present disclosure is mainly obtained from raw materials, such as a polyisocyanate, a polyol, a chain extender, a catalyst, and other additives. Those components are described in detail below.

<Polyisocyanate>

Examples of the polyisocyanate to be used may include a mixture containing 4,4'-diphenylmethane diisocyanate (MDI) trimer as a main component, a 1,5-pentamethylene diisocyanate trimer (isocyanurate form), a mixture of a xylylene diisocyanate trimer (isocyanurate form) and a xylylene diisocyanate monomer, 4,4'-diphenylmethane diisocyanate (MDI), 2,4-tolylene diisocyanate (2,4-TDI), 2,6-tolylene diisocyanate (2,6-TDI), xylylene diisocyanate (XDI), 1,5-naphthylene diisocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylylene diisocyanate (TMXDI), carbodiimide-modified MDI, and polymethylene phenyl polyisocyanate (PAPI).

The above-mentioned polyisocyanates may be used alone or in combination thereof. In addition, the polyisocyanate may be allowed to react with any of various polyols to be converted into a prepolymer before use. Of those, a mixture of a xylylene diisocyanate trimer (isocyanurate form) and a xylylene diisocyanate monomer is preferably used because of being excellent in mechanical characteristics. Such mixtures may be used alone or in combination thereof.

When the hard segment crystallizes, although the hardness is increased, the brittleness tends to be reduced. For this reason, in order to keep the formation of the hard segment appropriate, the kind and amount of the isocyanate are appropriately adjusted so as to achieve an appropriate chemical bond amount. Of those, an isocyanate that is a trimer is particularly preferred because the presence of a branched structure or a strain structure in a skeleton can reduce the formation of the hard segment.

<Polyol>

Examples of the polyol may include polyester polyol, polyether polyol, caprolactone ester polyol, polycarbonate ester polyol, and silicone polyol. A specific example thereof is polyester polyol.

In order to obtain the effect of the present disclosure, it is required that the crystal structure be gradually attenuated from the surface toward the inside. Accordingly, the polyester polyol is preferably a polyester polyol that is solid (crystallized) at normal temperature, has a structural unit represented by the following chemical formula (1), has a linear alkyl chain, and has a crystallization temperature of 0 to 150° C.

Chemical formula (1)

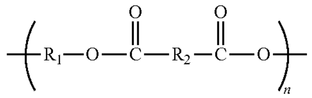

In the chemical formula (1), $R_1$ and $R_2$ each independently represent a linear divalent hydrocarbon group having 4 to 10 carbon atoms, and "n" is an integer of 1 or more.

From the viewpoints of production and the characteristics of the crystal structure, it is preferred to use two or more kinds of polyester polyols different from each other in $R_1$ and $R_2$. In addition, the polyester polyol may contain a linear divalent hydrocarbon group having 2 or 3 carbon atoms.

The number-average molecular weight of such polyester polyol as a whole is preferably 400 to 10,000, particularly preferably 800 to 4,000. A number-average molecular weight of 800 or more is particularly preferred because the hardness and chipping resistance of the urethane to be obtained by virtue of the crystallization of the main chain of the polyol are satisfactory, and a number-average molecular weight of 4,000 or less is particularly preferred because the polyester polyol is excellent in handleability by having an appropriate viscosity when heated and used, and provides a satisfactory hardness.

When $R_1$ and $R_2$ in the chemical formula (1) each have 3 or less carbon atoms, crystallization hardly progresses, and hence the hardness of the surface is difficult to increase. In addition, when $R_1$ and $R_2$ each have 11 or more carbon atoms, there is a tendency that excessive crystallization occurs to reduce the brittleness.

Meanwhile, when $R_1$ and $R_2$ each represent a linear divalent hydrocarbon group having 4 to 10 carbon atoms, the crystal structure to be formed due to the orientation of the main chain moiety of the polyol has a high hardness, and the hardness is reduced as the crystal structure disappears. Accordingly, when the crystal structure is attenuated from the surface toward the inside, the hardness can be continuously reduced from the surface toward the inside. Consequently, the cleaning blade according to the present disclosure can increase the abutting pressure on the image-bearing member. In addition, the followability to the shape of the image-bearing member can even be enhanced.

The structure represented by the chemical formula (1) may be used alone. However, when the asymmetry of the crystal structure is increased, a structure that is more excellent in impact resistance can be formed, and a cured layer that is more excellent in chipping resistance can be formed. For this reason, it is preferred to combine two or more kinds of polyester polyols each having a linear alkyl chain having 4 to 10 carbon atoms.

Further, a case in which the following first polyester polyol and the following second polyester polyol are used in combination is preferred because an interaction between crystal structures is promoted to further improve the impact resistance.

First polyester polyol: polyester polyol having a linear alkyl chain having 4 to 6 carbon atoms Second polyester polyol: polyester polyol having both of a linear alkyl chain having 7 to 10 carbon atoms and a linear alkyl chain having 4 to 6 carbon atoms Examples of the suitable polyester polyol include NIPPOLLAN (trademark) 164 (manufactured by Tosoh Corporation), NIPPOLLAN (trademark) 4073 (manufactured by Tosoh Corporation), NIPPOLLAN (trademark) 136 (manufactured by Tosoh Corporation), NIPPOLLAN (trademark) 4009 (manufactured by Tosoh Corporation), NIPPOLLAN (trademark) 4010 (manufactured by Tosoh Corporation), NIPPOLLAN (trademark) 3027 (manufactured by Tosoh Corporation), POLYLITE (trademark) OD-X-2555 (manufactured by DIC Corporation), POLYLITE (trademark) OD-X-2523 (manufactured by DIC Corporation), and ETERNACOLL (trademark) 3000 series (manufactured by Ube Industries, Ltd.).

The structure of the chemical formula (1) may be determined using a mass spectrometer of a direct sample introduction system involving ionizing a sample molecule.

Specifically, M2/M1 is preferably 0.0001 to 0.1000, where M1 represents a detection amount of all ions when a sample to be sampled is heated to be vaporized in an ionization chamber, and is heated at a temperature increase rate of 10° C./s to 1,000° C. through use of a mass spectrometer of a direct sample introduction system involving ionizing a sample molecule, and M2 represents an integral intensity of a peak of an extracted ion thermogram corresponding to an m/z value derived from the chemical formula (1).

When the structure of the chemical formula (1) is contained within this range, the surface can be crystallized while the occurrence of a curing failure is suppressed.

When a polyurethane is produced from a polyester polyol and an isocyanate compound, a urethane bond is formed through a reaction between a terminal of the polyester polyol and the isocyanate. As a result, a hard segment is produced via hydrogen bonding of the urethane bond in some cases, and the crystallized polyester polyol cannot move sufficiently, resulting in a failure to sufficiently exhibit toughness in some cases.

In view of the foregoing, a polyrotaxane having a hydroxy group may be included as a polyol component. Of those, a polyrotaxane containing two or more hydroxy groups per molecule thereof is preferred. It is particularly preferred to use a polyrotaxane having a hydroxy group introduced at the terminal of a side chain of a cyclic molecule.

The polyrotaxane has a structure in which a linear molecule penetrates through a larger number of cyclic molecules, and the cyclic molecules can freely move on the linear molecule. Accordingly, the polyrotaxane has a structure in which blocking groups are bonded to both terminals of the linear molecule to prevent the cyclic molecules from dethreading from the linear molecule. The cyclic molecules each have a hydroxy group, and hence polyester polyol terminals are bonded via the isocyanate compound. As a result, the addition of the polyrotaxane markedly improves a range in which the crystallized polyester polyol can move at the time of deformation. Accordingly, fracture at the time of deformation can be effectively suppressed, and an improving effect on toughness is promoted.

In addition, when a urethane structure having a linear structure represented by $—(CH_2)m-$ ("m" is an integer of 4 or more) is formed with the addition of the polyrotaxane, an improvement in toughness through the crystallization of the linear structure moiety can also be expected.

An example of the polyrotaxane is "SeRM (trademark) Super Polymer" commercially available from Advanced Softmaterials Inc. In this embodiment, the above-mentioned polyrotaxane having a hydroxy group introduced at the terminal of a side chain of a cyclic molecule is preferably used.

<Chain Extender>

For example, a glycol is used as the chain extender. Examples of such glycol may include ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol), and triethylene glycol. In addition, besides the above-mentioned glycols, other polyhydric alcohols may also be used, and examples thereof may include trimethylolpropane, glycerin, pentaerythritol, and sorbitol. Those chain extenders may be used alone or in combination thereof.

<Catalyst>

As the catalyst, a catalyst for curing a polyurethane elastomer to be generally used may be used. An example thereof is a tertiary amine catalyst, and specific examples thereof include: dibutyltin dilaurate; amino alcohols, such as dimethylethanolamine and N,N,N'-trimethylaminopropylethanolamine; trialkylamines such as triethylamine; tetraalkyldiamines such as N,N,N',N'-tetramethyl-1,3-butanediamine; and triethylenediamine, a piperazine-based compound, and a triazine-based compound.

In addition, an organic acid salt of an alkali metal, such as potassium acetate or potassium octylate, may also be used. Further, a metal catalyst to be generally used for urethanization, such as dibutyltin dilaurate, may also be used. Those catalysts may be used alone or in combination thereof.

As required, additives, such as a pigment, a plasticizer, a water-proofing agent, an antioxidant, a UV absorber, and a light stabilizer, may be further blended.

[Supporting Member]

A material for forming the supporting member of the cleaning blade of the present disclosure is not particularly limited, and the supporting member may be produced from, for example, a metal material, such as a steel plate, a stainless-steel plate, a zinc-plated chromate-coated steel plate, or a chromium-free steel plate, or a resin material, such as 6-nylon or 6,6-nylon.

In addition, a method of joining the supporting member 3 and the elastic member 2 to each other is not particularly limited, and an appropriate method may be selected from known methods. An example thereof may be a method involving bonding the members to each other using an adhesive such as a phenol resin.

<Method of Producing Cleaning Blade>

As a method of producing the cleaning blade according to the present disclosure, there is given a method involving producing the elastic member through use of the above-mentioned polyol in such a manner as to satisfy the following curing conditions.

[Curing Conditions]

In general, in order that a polyurethane may be sufficiently cured by causing a urethanization reaction to reliably proceed, temperature and time are controlled. Meanwhile, in the present disclosure, by virtue of adopting the following curing conditions, a reduction in brittleness accompanying an increase in hardness, which has been a problem with the related-art polyurethane, can be prevented. The curing conditions are described in detail below.

In the production of the related-art polyurethane, the polyurethane is cured through heating until its crosslinking is completed, followed by aging under a predetermined atmosphere. On the other hand, in the production of the elastic member according to the present disclosure, curing is terminated before the crosslinking of the polyurethane is completed, and then the polyurethane is subjected to secondary curing by being aged under an atmosphere having a temperature equal to or lower than the crystallization temperature of the polyol.

In a semi-cured polyurethane obtained by terminating a curing reaction under a state in which the crosslinking of the polyurethane has not been completed yet, the unreacted polyol is present in a state of having high molecular mobility. While this state is maintained, the semi-cured polyurethane is subjected to the secondary curing under an atmosphere having a temperature equal to or lower than the crystallization temperature of the polyol. Thus, a temperature gradient is formed from the surface of the semi-cured polyurethane toward the inside thereof. Consequently, the surface of the semi-cured polyurethane is rapidly cooled by being placed under the above-mentioned atmosphere, and the crystallization of the main chain moiety of the remaining polyol proceeds. Meanwhile, on the inside of the semi-cured polyurethane, the cooling by the placement under the above-mentioned atmosphere is delayed as compared to the surface, and hence the crosslinking of the polyurethane proceeds and the crystallization of the polyol does not proceed very much. As a result, there is formed a structure in which the amount of the crystallized polyol is gradually attenuated from the surface toward the inside. The thus obtained elastic member has an increased hardness in the vicinity of the surface because of the crystallization of the main chain moiety of the polyol. On the other hand, the hardness is low on the inside because the crystallization of the polyol has not proceeded relatively. Accordingly, the Martens hardness is gradually attenuated from the surface toward the inside.

When the polyurethane is cured until its crosslinking is completed as in the related art, the crosslinked structure of the polyurethane is sufficiently developed, and hence, even if the unreacted polyol remains, its molecular mobility is low. Accordingly, it is conceived that, even when aging is thereafter performed at a temperature equal to or lower than the crystallization temperature of the polyol, the main chain moiety of the polyol is hardly oriented and the crystallization of the surface hardly proceeds.

In addition, when the curing reaction is terminated under a state in which the crosslinking of the polyurethane is incomplete, and then aging is performed under an atmosphere having a temperature higher than the crystallization temperature of the polyol, the crystallization of the main chain moiety of the polyol does not proceed and the crosslinking of the polyurethane also proceeds at the surface. Accordingly, it is difficult to increase the Martens hardness of the surface of the polyurethane to be obtained.

In the present disclosure, the urethane is chemically crosslinked in the primary curing, though incompletely, and hence the surface after the secondary curing has a configuration in which the crystal structure of the main chain moiety of the polyol and the chemical crosslinking of the urethane coexist. When only the crystal structure of the main chain moiety of the polyol is present at the surface, the Martens hardness of the surface is excessively high, and hence the cleaning blade cannot flexibly abut on a photosensitive drum that is in a state of having streak-like unevenness formed on its surface when used over a long period of time, leading to the occurrence of a cleaning failure.

The crystallization of the polyol may be adjusted based on the degree to which the chemical crosslinking of the urethane proceeds at the time of the primary curing, and the difference between the temperature of the atmosphere at the time of the secondary curing and the crystallization temperature of the polyol. As the chemical crosslinking of the urethane at the time of the primary curing is reduced, the molecular mobility of the polyol after the primary curing increases to facilitate the crystallization of the surface, and to make it easier for the crystallization to reach deeper inside. Further, as the difference between the temperature of the atmosphere at the time of the secondary curing and the crystallization temperature of the polyol is increased, the crystallization proceeds more easily, and the crystallization at the surface and to the inside is promoted.

A cleaning blade in which the elastic member and the supporting member are integrated may be obtained by placing the supporting member in a mold for a cleaning blade, then pouring the above-mentioned polyurethane raw material composition into the mold, and performing the primary curing and the secondary curing as described above.

In addition, a polyurethane elastomer sheet cured under production conditions satisfying the above-mentioned curing conditions may be molded, and then cut into a strip shape and bonded onto the supporting member. A method for the bonding may be selected from: a method involving applying or sticking an adhesive onto the supporting member and bonding the elastic member thereto; a method involving performing the bonding by stacking the elastic member and the supporting member together and heating and pressurizing the stack; and the like.

In addition, after the secondary curing, cutting may be performed to adjust the shape of the edge of the cleaning blade to be brought into abutment with the image-bearing member. When the polyurethane elastomer sheet is produced in advance and bonded to the supporting member, the cutting may be performed before the bonding or after the bonding.

<Process Cartridge and Electrophotographic Image Forming Apparatus>

The cleaning blade may be used by being incorporated into a process cartridge that is removably mounted onto an electrophotographic image forming apparatus.

Specifically, the cleaning blade according to the present disclosure may be used in, for example, a process cartridge including an image-bearing member serving as a member to be cleaned, and a cleaning blade arranged to be able to clean the surface of the image-bearing member. Such process cartridge is conducive to stable formation of a high-quality electrophotographic image.

In addition, an electrophotographic image forming apparatus according to one aspect of the present disclosure includes an image-bearing member such as a photosensitive member, and a cleaning blade arranged to be able to clean the surface of the image-bearing member, and may use, as the cleaning blade, the cleaning blade according to the present disclosure. Such electrophotographic image forming apparatus is capable of stably forming a high-quality electrophotographic image.

The present disclosure can provide the electrophotographic cleaning blade excellent in chipping resistance and capable of stably exhibiting excellent cleaning performance even when used over a long period of time by virtue of the crystal structure due to the orientation of the main chain moiety, $-(CH_2)m-$ ("m" is an integer of 4 or more), of the polyol.

In addition, according to another aspect of the present disclosure, the process cartridge conducive to the formation of a high-quality electrophotographic image can be obtained. In addition, according to still another aspect of the present disclosure, the electrophotographic image forming apparatus capable of stably forming a high-quality electrophotographic image can be obtained.

EXAMPLES

The present disclosure is described below by way of Production Examples, Examples, and Comparative Examples, but the present disclosure is by no means limited thereto. Reagents or industrial chemicals were used as raw materials other than those indicated in Examples and Comparative Examples.

Polyisocyanate Component (1) Mixture of a xylylene diisocyanate trimer (isocyanurate form) and a xylylene diisocyanate monomer (molar ratio: trimer:monomer=1:1.2): product name: "Takenate (trademark) XD-131R", manufactured by Mitsui Chemicals, Inc.

(2) Mixture containing a 4,4'-diphenylmethane diisocyanate (MDI) trimer as a main component: product name: "Millionate (trademark) MR-200", manufactured by Tosoh Corporation (3) 1,5-Pentamethylene diisocyanate trimer (isocyanurate form): product name: "STABiO (trademark) D-370N", manufactured by Mitsui Chemicals, Inc.

(4) Xylylene diisocyanate: product name: "XDI", manufactured by Tokyo Chemical Industry Co., Ltd.

(5) 4,4'-Diphenylmethane diisocyanate: product name: "MDI", manufactured by Tosoh Corporation Polyol Component (1) Polyester polyol: product name: "NIPPOLLAN (trademark) 164", manufactured by Tosoh Corporation A combination of $R_1$ and $R_2$ in the chemical formula (1) having 4 and 6 carbon atoms, respectively.

(2) Polyester polyol: product name: "NIPPOLLAN (trademark) 4009", manufactured by Tosoh Corporation $R_1$ and $R_2$ in the chemical formula (1) each having 4 carbon atoms.

(3) Polyester polyol: product name: "POLYLITE (trademark) OD-X-2555", manufactured by DIC Corporation A combination of $R_1$ and $R_2$ in the chemical formula (1) having 6 and 10 carbon atoms, respectively.

(4) Polyrotaxane: product name: "SH1300P-B", manufactured by ASM Inc.

Chain Extender 1,4-Butanediol (1,4-BD): manufactured by Tokyo Chemical Industry Co., Ltd.

Catalyst (1) Dibutyltin dilaurate: manufactured by Tokyo Chemical Industry Co., Ltd.

(2) Tertiary amine catalyst: product name: "RZETA (trademark)", manufactured by Tosoh Corporation

Preparation Example of Urethane Polymer

Example 1

A polyol component, a chain extender, and a urethanization catalyst were blended at masses shown in Table 1. Each component was subjected to desiccation treatment through heating under reduced pressure as required. The blended liquid mixture was stirred under reduced pressure for 5 minutes to provide a uniform solution containing a polyol as a main component.

The solution containing a polyol as a main component was blended with a polyisocyanate component at a mass shown in Table 1, and the mixture was stirred again under reduced pressure for 3 minutes and then cast into a mold that had been heated to 130° C. (thickness: 2 mm, height: 40 mm, width: 200 m). Primary curing was performed for 3 minutes, and then the mold was rapidly cooled to 25° C. The resultant was subjected to secondary curing by being kept in the mold for 12 hours. After that, the resultant was removed from the mold. Thus, an integral molded body 1 of a polyurethane and a supporting member was obtained.

The mold used had a release agent applied thereto before the polyurethane elastomer composition was poured thereinto. A mixture of the following materials was used as the release agent.

| | |
|---|---|
| ELEMENT14 PDMS 1000-JC (product name, manufactured by Momentive Performance Materials) | 5.06 g |
| ELEMENT14 PDMS 10K-JC (product name, manufactured by Momentive Performance Materials) | 6.19 g |
| SR1000 (product name, manufactured by Momentive Performance Materials) | 3.75 g |
| EXXSOL (trademark) DSP145/160 (product name, manufactured by Exxon Mobil Corporation) | 85 g |

The integral molded body was appropriately cut to provide a cleaning blade 1. The angle of its edge was set to 90°, and the distances in the short-side direction, thickness direction, and long-side direction of the polyurethane were set to 7.5 mm, 1.8 mm, and 240 mm, respectively. The resultant cleaning blade 1 was evaluated by the following methods.

[Measurement Method for Polyol Component]

The measurement of a polyol component was performed by a direct sample introduction method (DI method) involving directly introducing a sample into an ion source without passage through a gas chromatograph (GC).

POLARIS Q manufactured by Thermo Fisher Scientific K.K. was used as an apparatus, and a direct exposure probe (DEP) was used.

Assuming that a first line segment was drawn on the distal end surface parallel to the distal end-side edge at a distance of 10 μm from the distal end-side edge, the length of the first line segment was represented by L, and the polyurethane was scraped with a bio cutter from point P1 on the first line segment at ½L from one end side.

About 0.1 μg of the sample sampled at the P1 was fixed to a filament positioned at the distal end of the probe to be directly inserted into an ionization chamber. After that, the sample was rapidly heated at a constant temperature increase rate (10° C./s) from room temperature to 1,000° C. to be vaporized, and the resultant gas was detected with a mass spectrometer.

The detection amount M1 of all ions was defined as the total of the integral intensities of all peaks in the resultant total ion current thermogram. In addition, the detection amount M2 of the polyol component was defined as an integral intensity over the range of an m/z value calculated by the calculation equation (2).

Range of m/z Value $$\{200+[14\times(x-4)+14\times(y-4)]+1\}\pm0.5 \qquad \text{Equation (2)}$$

"x" and "y" represent the respective carbon numbers of $R_1$ and $R_2$ in the chemical formula (1).

An arithmetic average value obtained from samples scraped at five sites from point P1 was adopted as an M2/M1 value in the present disclosure.

[Crystallinity Analysis]

A crystallinity was measured by grazing incidence X-ray diffraction (XRD) using an X-ray diffractometer (product name: ATX-G; manufactured by Rigaku Corporation).

An X-ray incidence angle was set to $\omega_1$=0.5°, $\omega_2$=1°, and $\omega_3$=3°, crystal peak areas in measurement at the respective angles were set to $I_{c1}$, $I_{c2}$, and $I_{c3}$, respectively, and amorphous peak areas therein were set to $I_{a1}$, $I_{a2}$, and $I_{a3}$, respectively. As the X-ray incidence angle becomes smaller, a state closer to the surface side is shown.

Measurement conditions are as described below.

Tube: Cu (40 kV, 20 mA)

Slit condition: S2 (1 mm in length, 0.1 mm in width)

R.S., G.S.: open

Soller slit=0.41

Origin 2016 (developer: OriginLab Corporation, USA) was used as software for peak area analysis. First, a background was determined and subtracted from an XRD pattern. Next, peaks were separated into a crystal peak at 2θ=21° and an amorphous component-derived peak at 2θ=20°. Numerical fitting was applied with the position of the crystal peak being fixed, and with constraints with numerical values being placed so that the integral value of each component took a positive value and the half-width of each peak became an appropriate value. An area value Ic of the crystal peak was defined as an area value obtained by integrating a peak having a peak top at 2θ=21° from the baseline over the region of 2θ=13 to 300 at a time when the baseline was drawn for 2θ=3 to 40°. An area value Ia of the amorphous peak was defined as an area value obtained by integrating a peak having a peak top at 2θ=20.2° from the baseline over the region of 2θ=13 to 300 at a time when the baseline was drawn for 2θ=3 to 40°. Li and Li were substituted into the following equation (1) to obtain an index $K\omega_1$ of crystallinity. Similarly, $I_{c2}$ and $I_{a2}$ were substituted into the following equation (1) to obtain an index $K\omega_2$, and $I_{c3}$ and $I_{a3}$ were substituted into the following equation (1) to obtain an index $K\omega_3$.

$$K\omega=[I_c/(I_c+I_a)]\times 100 \quad (1)$$

The crystallinity was evaluated by the evaluation criterion of whether the resultant $K\omega_1$, $K\omega_2$, and $K\omega_3$ satisfied the following relationship.

Crystallinity:

Y: Case of satisfying $K\omega_1>K\omega_2>K\omega_3$

N: Case of not satisfying $K\omega_1>K\omega_2>K\omega_3$

In the case where $K\omega_1$, $K\omega_2$, and $K\omega_3$ satisfy the relationship of $K\omega_1>K\omega_2>K\omega_3$, it is indicated that the ratio of the crystal peak at 2θ=21° is decreased from the surface side toward the inside. That is, it is indicated that the crystallinity is reduced from the surface of the cleaning blade toward the inside thereof.

Figure 3:
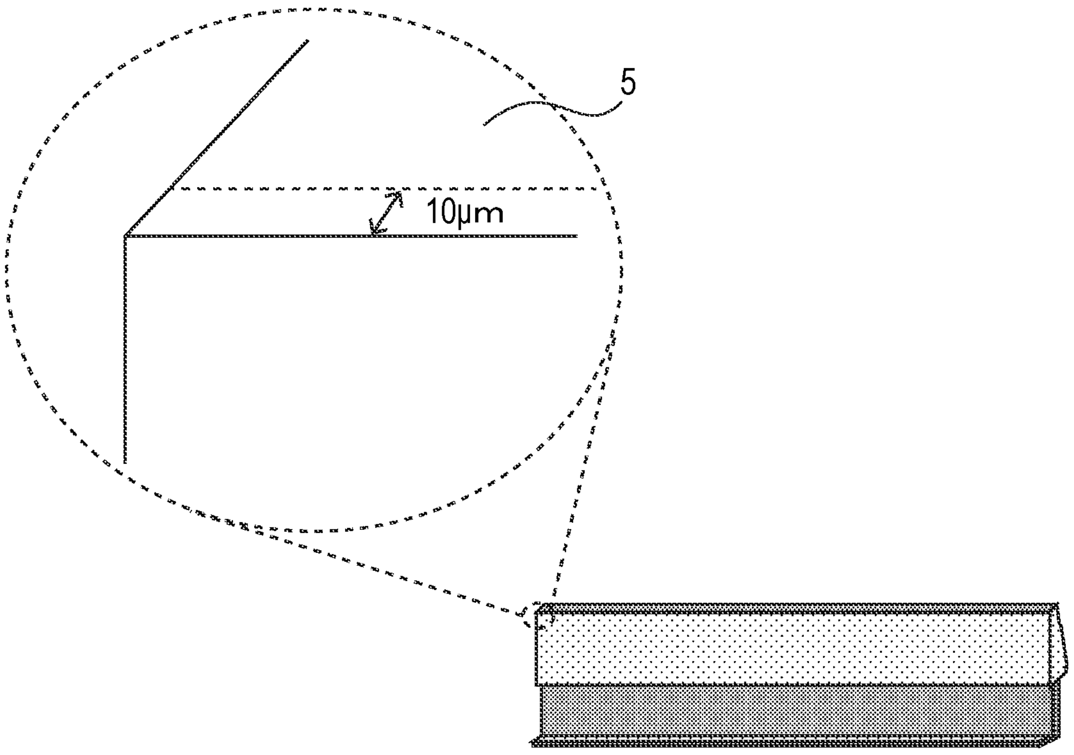
FIG. 3 is a view for illustrating a line segment drawn on the distal end surface of an elastic member parallel to the distal end-side edge thereof at a distance of 10 μm from the distal end-side edge.
Figure 4:
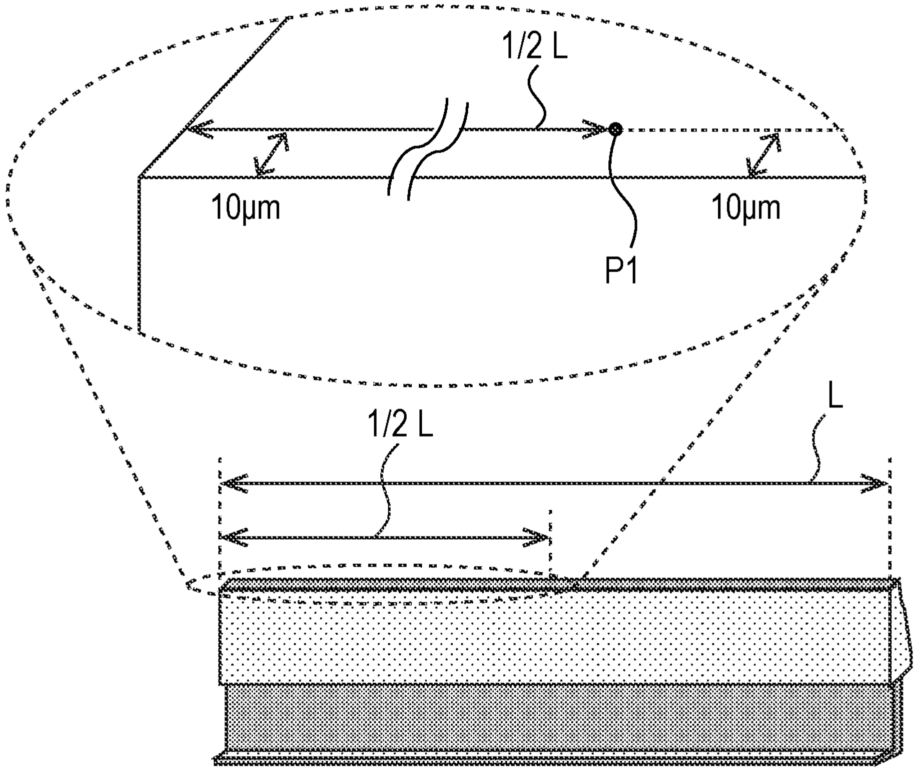
FIG. 4 is a view for illustrating a position at which grazing incidence X-ray diffraction, a Martens hardness, and an erosion rate are measured.

As illustrated in FIG. 3 and FIG. 4, assuming that a first line segment was drawn on the distal end surface 5 parallel to the distal end-side edge at a distance of 10 μm from the distal end-side edge, the length of the first line segment was represented by L and a measurement point was set to point P1 on the first line segment at ½L from one end side.

[Martens Hardness]

A Martens hardness was measured using a "Shimadzu dynamic ultramicrohardness meter "DUH-W211S" manufactured by Shimadzu Corporation. A measurement environment was set to a temperature of 23° C. and a relative humidity of 55%. An indenter used was a triangular pyramid diamond indenter having a ridge interval of 115°, and the Martens hardness was determined from the following calculation equation (3).

$$\text{Martens hardness: } HM=\alpha\times P/D^2 \quad \text{Equation (3)}$$

In the equation (3), α represents a constant based on the shape of the indenter, P represents a test force (mN), and D represents the penetration amount of the indenter into the sample (indentation depth)(μm). Measurement conditions are as described below.

α: 3.8584

D: 2.0 μm

Load speed: 0.03 mN/sec

Retention time: 5 seconds

Measurement point: Assuming that, as illustrated in FIG. 3, a first line segment was drawn parallel to the distal end-side edge at a distance of 10 μm from the distal end-side edge, when, as illustrated in FIG. 4, the length of the first line segment was represented by L and the point on the first line segment at ½L from one end side was represented by P1, a Martens hardness HM1 was measured at the position of the P1.

Figure 5:
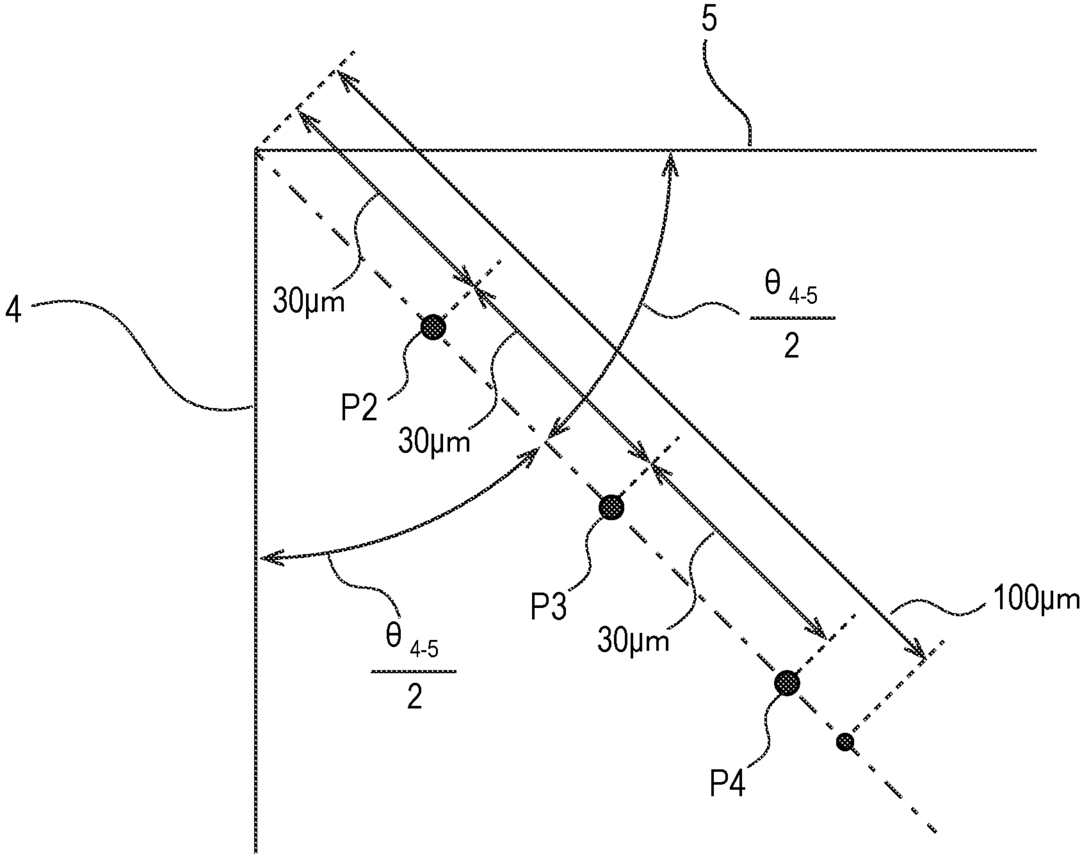
FIG. 5 is a view for illustrating positions at each of which the measurement of a Martens hardness is performed.

Further, as illustrated in FIG. 5, the bisector of an angle θ4.5 formed by the main surface 4 and the distal end surface was drawn on a cross-section of the elastic member orthogonal to the distal end surface 5 and the distal end-side edge, including the P1. Then, Martens hardnesses HM2, HM3, and HM4 were measured at respective positions (P2, P3, and P4) on the bisector at 30 μm, 60 μm, and 90 μm from the distal end-side edge.

[Erosion Rate E]

An erosion rate was measured using "MSE-A Type Tester" manufactured by Palmeso Co., Ltd.

Spherical alumina powder having an average particle diameter of 3.0 μm (product name: "AX3-15", manufactured by Nippon Steel & Sumikin Materials Co., Ltd. Micron Co.) was dispersed in water to prepare a slurry containing spherical alumina at 3 mass % with respect to the total mass of the slurry.

Figure 6:
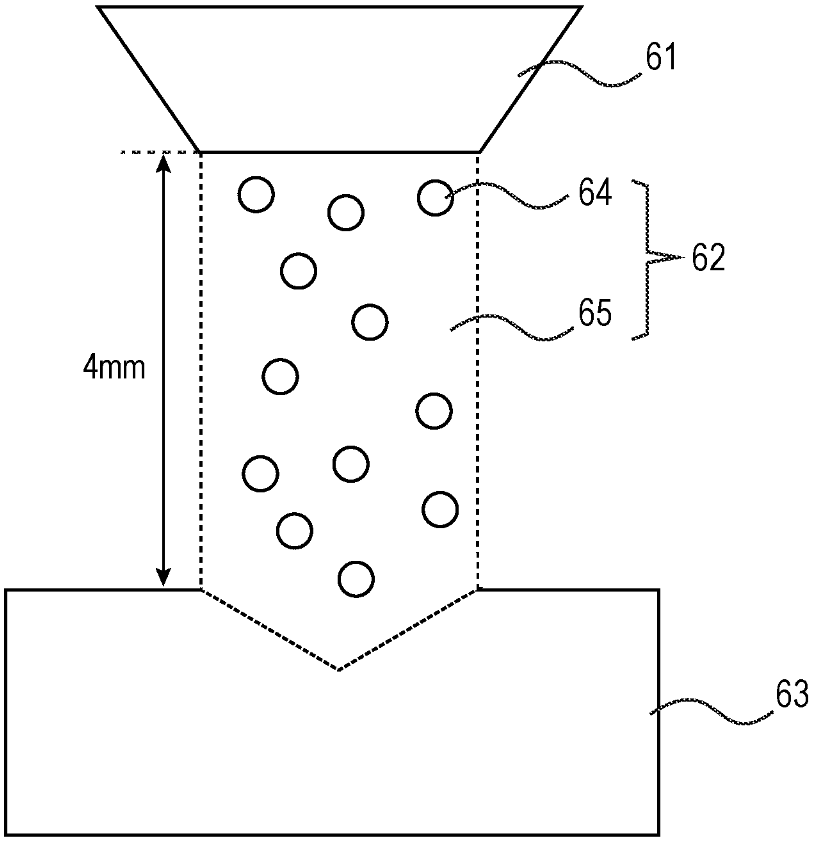
FIG. 6 is a view for illustrating a measurement method for an erosion rate.

As illustrated in FIG. 6, the cleaning blade was fixed to a stage (not shown) so that the slurry 62 jetted from a jetting nozzle 61 was jetted perpendicularly to the surface of the cleaning blade 63. The distance between the surface of the cleaning blade 63 and the lower end of the jetting nozzle 61 was set to 4 mm, and the slurry 62 in which spherical alumina 64 was dispersed in water 65 was jetted.

A measurement environment was set to a temperature of 23° C. and a relative humidity of 55%, a slurry jet speed was set to 100 m/sec, and a cut depth was measured with a probe-type surface shape measurement device manufactured by Kosaka Laboratory Ltd. using a probe with a diamond needle having a distal end radius R of 10 μm. The jetting conditions in this case were adjusted by the following method.

The slurry jetting conditions were adjusted in advance in the above-mentioned measurement environment using an existing hardness standard piece (product name: "HRC-45", manufactured by Yamamoto Scientific Tool Laboratory Co., Ltd.) so that a cut of 6.0 μm was made when 6.0 g of the slurry was jetted. The erosion rate E in this case is 1.0 μm/g.

Assuming that, as illustrated in FIG. 3, a first line segment was drawn parallel to the distal end-side edge at a distance of 10 μm from the distal end-side edge, as illustrated in FIG. 4, the length of the first line segment was represented by L, and a point on the first line segment at a distance of ½L from one end side was represented by P1. The slurry was jetted until a cut depth of 20 μm was achieved at the P1, and the erosion rate E was determined from the amount of the slurry used, through use of the following equation (3).

$$\text{Erosion rate } E\ (\mu m/g)=\text{cut depth } (20\ \mu m)/\text{jet amount (g) of spherical alumina particles} \quad (3)$$

[Evaluation of Cleaning Performance]

The cleaning blade 1 was incorporated into the process cartridge of a color laser beam printer (product name; HP LaserJet Enterprise Color M553dn, manufactured by Hewlett-Packard Company) as a cleaning blade for a photosensitive drum serving as a member to be cleaned.

Then, under a normal-temperature environment (temperature: 23° C., relative humidity: 55%), image formation was performed on 10,000 sheets, and then evaluation was performed (hereinafter referred to as "normal evaluation").

Further, the developing machine used was replaced with the developing machine of a fresh cartridge in which the whole amount of its toner had been replaced, and image formation was performed on 10,000 sheets again, followed by evaluation (hereinafter referred to as "2× evaluation").

In addition, the evaluation was performed while waste toner was sucked out as appropriate by making a hole in the back surface of the cartridge. For the resultant images, performance was ranked by the following evaluation criteria.

Rank A: An image failure (streak on the image) due to the cleaning blade occurs in neither the normal evaluation nor the 2× evaluation.

Rank B: An image failure (streak on the image) due to the cleaning blade does not occur in the normal evaluation, and occurs to an extremely slight degree (streak on the image having a streak length of 5 mm or less occurs) in the 2× evaluation.

Rank C: An image failure (streak on the image) due to the cleaning blade does not occur in the normal evaluation, but slightly occurs (streak on the image having a streak length of more than 5 mm but 10 mm or less occurs) in the 2× evaluation.

Rank D: An image failure (streak on the image) due to the cleaning blade does not occur in the normal evaluation, but occurs (streak on the image having a streak length of more than 10 mm occurs) in the 2× evaluation.

Rank E: An image failure (streak on the image) due to the cleaning blade occurs in both the normal evaluation and the 2× evaluation.

[Edge Chipping Evaluation of Cleaning Blade]

After the end of the above-mentioned cleaning performance evaluation (2× evaluation), the cleaning blade was removed from the cartridge, and was observed with a digital microscope (product name: main body: VHX-5000, lens: VH-ZST, manufactured by Keyence Corporation) at a magnification of 1,000 times.

Figure 7:
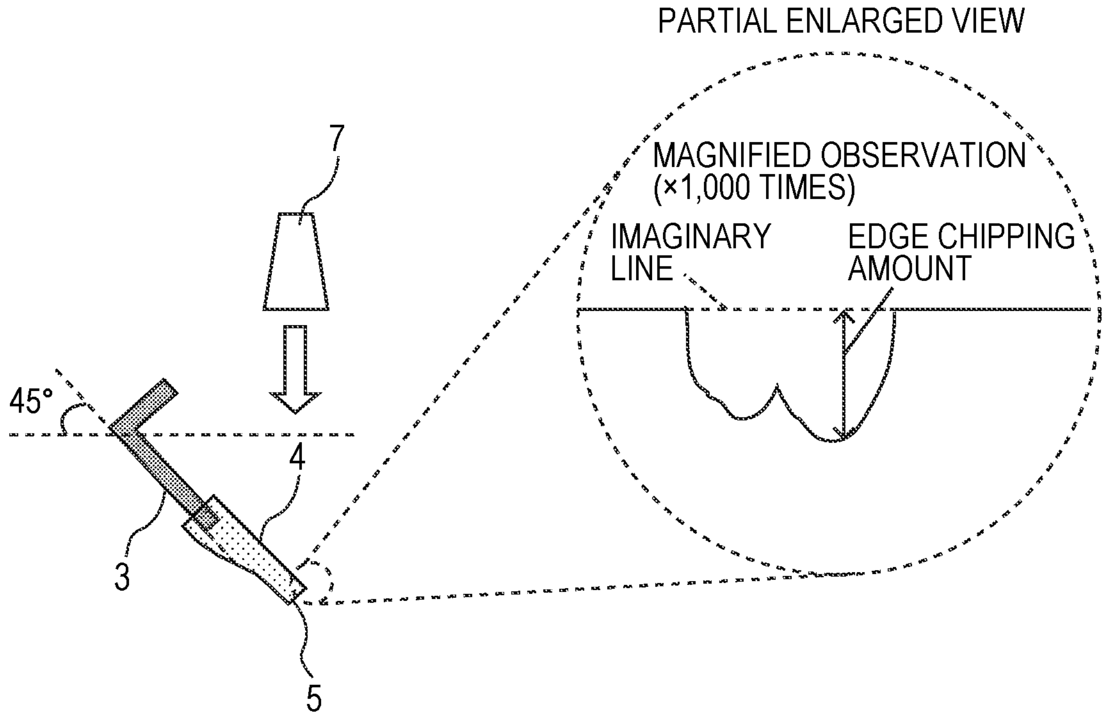
FIG. 7 is a view for illustrating a measurement method for edge chipping.

As illustrated in FIG. 7, the cleaning blade was placed below a digital microscope 7 in a state in which the supporting member 3 was tilted at an oblique angle of 450 with respect to a horizontal direction so that the supporting member 3 was directed upward and the distal end surface 5 of the elastic member was directed downward. Then, the entirety (length L) of the long-side direction of the distal end portion (portion near the distal end surface 5) of the main surface 4 of the elastic member of the cleaning blade was observed.

As illustrated in the partial enlarged view of FIG. 7, the maximum value of the distance of an edge chipped portion in the short-side direction (distance from an imaginary line representing the main surface in the case of assuming that no chipping occurred) was measured as an "edge chipping amount", and evaluation was performed by the following criteria.

Rank $A^+$: The edge chipping amount is less than 0.1 μm.

Rank A: The edge chipping amount is 0.1 μm or more and less than 0.5 μm.

Rank B: The edge chipping amount is 0.5 μm or more and less than 1.0 μm.

Rank C: The edge chipping amount is 1.0 μm or more and less than 3.0 μm.

Rank $C^-$: The edge chipping amount is 3.0 μm or more and less than 3.5 μm.

Rank D: The edge chipping amount is 3.5 μm or more.

Examples 2 to 12

Cleaning blades 2 to 12 were obtained in the same manner as in Example 1 except that the blending and the curing conditions were changed as shown in Table 1. The same evaluations as in Example 1 were performed, and the results of the evaluations are shown in Table 2A and Table 2B.

Comparative Examples 1 and 2

Cleaning blades 13 and 14 were obtained in the same manner as in Example 1 except that the blending and the curing conditions were changed as shown in Table 1. The same evaluations as in Example 1 were performed, and the results of the evaluations are shown in Table 2B.

Comparative Example 3

An impregnant was prepared by mixing the following materials.

Polymeric MDI (product name: MR-100, manufactured by Nippon Polyurethane Industry Co., Ltd.) 10 g Silicone resin (product name: MODIPER FS-700, manufactured by NOF Corporation) 2 g 2-Butanone (manufactured by Tokyo Chemical Industry Co., Ltd.) 88 g The cleaning blade 8 obtained in the same manner as in Example 8 was immersed in the prepared impregnant for 180 seconds, followed by aging under an environment having a temperature of 23° C. and a relative humidity of 55% for 3 hours to provide a cleaning blade 15. The same evaluations as in Example 1 were performed, and the results of the evaluations are shown in Table 2B.

TABLE 1

| | | | Example | | | | | | | | | | | | Comparative Example | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 1 | 2 | 3 |
| Polyol component | NIPPOLAN 4009 | g | | 57.3 | 54.6 | 68.1 | 70.1 | 57.3 | 68.1 | | | 52.3 | | 54.6 | | | |
| | NIPPOLAN 164 | g | 68 | | | | | | | 68 | 58 | | 76.7 | | 68 | | 68 |
| | Polylite OD-X-2555 | g | | 24.6 | 23.4 | | | 24.6 | | | | 19.6 | | 23.4 | | 91.3 | |
| | SH1300P-B | g | | | | | | | | | 10 | 10 | | | | | |

TABLE 1-continued

| | | | Example | | | | | | | | | | | | Comparative Example | | |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 1 | 2 | 3 |
| Poly-isocyanate component | Takenate XD-131R | g | 30.1 | | | 30.1 | | | 30.1 | 30.1 | 30.1 | | | | 30.1 | | 30.1 |
| | Millionate MR-200 | g | | 11.4 | | | | 11.4 | | | | 11.4 | | 7.5 | | 5.3 | |
| | XDI | g | | 6.1 | | | 11 | 6.1 | | | | 6.1 | | | | 2.8 | |
| | MDI | g | | | 7.5 | | | | | | | | 7.5 | 13.9 | | | |
| | STABiO D-370N | g | | | 13.9 | | 16.6 | | | | | | 13.9 | | | | |
| Chain extender | Butanediol | g | 1.9 | 0.7 | 0.6 | 1.9 | 2 | 0.7 | 1.9 | 1.9 | 1.9 | 0.7 | 1.9 | | 1.9 | 0.6 | 1.9 |
| Catalyst | Dibutyltin dilaurate | g | 0.02 | | | 0.02 | | | 0.02 | 0.02 | 0.02 | | 0.02 | | 0.02 | | 0.02 |
| | RZETA | g | | 1.01 | 1.01 | | 1.01 | 1.01 | | | | 1.01 | | 1 | | 1.01 | |
| Primary curing | Mold temperature | ° C. | 130 | 130 | 130 | 130 | 100 | 100 | 130 | 100 | 130 | 130 | 130 | 100 | 130 | 130 | 130 |
| | Curing time | min | 3 | 6 | 150 | 3 | 3 | 6 | 1 | 3 | 3 | 6 | 3 | 150 | 80 | 40 | 80 |
| Secondary curing | Temperature | ° C. | 25 | 55 | 25 | 25 | 25 | 55 | 25 | 25 | 25 | 55 | 25 | 25 | 130 | 60 | 130 |
| | Curing time | h | 12 | 12 | 12 | 12 | 12 | 12 | 12 | 12 | 12 | 12 | 12 | 12 | 12 | 12 | 12 |

TABLE 2A

| | | | Example | | | | | | | |
|---|---|---|---|---|---|---|---|---|---|---|
| | | | 1 | 2 | 3 | 4 | 5 | 6 | 7 | 8 |
| Mass spectrometry | M2/M1 | | 0.0442 | 0.0482 | 0.0460 | 0.0604 | 0.0650 | 0.0482 | 0.0604 | 0.0442 |
| Crystallinity analysis | | | Y | Y | Y | Y | Y | Y | Y | Y |
| Martens hardness | HM1 | ($N/mm^2$) | 3.0 | 1.0 | 3.0 | 2.0 | 4.2 | 2.0 | 1.0 | 5.0 |
| | HM2 (30 μm) | ($N/mm^2$) | 3.0 | 1.0 | 3.0 | 2.0 | 4.2 | 2.0 | 1.0 | 5.0 |
| | HM3 (60 μm) | ($N/mm^2$) | 0.6 | 0.6 | 0.7 | 0.6 | 0.7 | 0.6 | 0.6 | 0.7 |
| | HM4 (90 μm) | ($N/mm^2$) | 0.5 | 0.5 | 0.6 | 0.5 | 0.6 | 0.5 | 0.5 | 0.6 |
| Erosion rate E | | μm/g | 0.40 | 0.25 | 0.17 | 0.50 | 0.27 | 0.13 | 0.59 | 0.59 |
| Actual machine evaluation | Cleaning performance Evaluation rank | | B | C | B | C | A | C | C | A |
| | Edge chipping evaluation Evaluation rank | | C | B | A | C | B | A+ | C | C |
| | Edge chipping amount (μm) | | 1.5 | 0.6 | 0.1 | 2.0 | 0.7 | 0.0 | 2.8 | 2.8 |

TABLE 2B

| | | | Example | | | | Comparative Example | | |
|---|---|---|---|---|---|---|---|---|---|
| | | | 9 | 10 | 11 | 12 | 1 | 2 | 3 |
| Mass spectrometry | M2/M1 | | 0.0442 | 0.0482 | 0.0442 | 0.0460 | 0.0442 | 0.0900 | 0.0442 |
| Crystallinity analysis | | | Y | Y | Y | Y | N | N | N |
| Martens hardness | HM1 | ($N/mm^2$) | 5.0 | 1.0 | 6.0 | 4.8 | 0.6 | 2.5 | 3.2 |
| | HM2 (30 μm) | ($N/mm^2$) | 5.0 | 1.0 | 6.0 | 6.0 | 0.6 | 2.5 | 3.2 |
| | HM3 (60 μm) | ($N/mm^2$) | 0.7 | 0.6 | 0.8 | 0.6 | 0.6 | 2.5 | 3.2 |
| | HM4 (90 μm) | ($N/mm^2$) | 0.6 | 0.5 | 0.7 | 0.6 | 0.6 | 2.5 | 3.2 |
| Erosion rate E | | μm/g | 0.17 | 0.17 | 0.25 | 0.08 | 0.59 | 0.91 | 1.49 |
| Actual machine evaluation | Cleaning performance Evaluation rank | | A | C | D | A | D | C | B |
| | Edge chipping evaluation Evaluation rank | | A | A | B | A+ | C | D | D |

TABLE 2B-continued

| | Example | | | | Comparative Example | | |
|---|---|---|---|---|---|---|---|
| | 9 | 10 | 11 | 12 | 1 | 2 | 3 |
| Edge chipping amount (μm) | 0.1 | 0.1 | 0.6 | 0.0 | 2.8 | 4.0 | 5.0 |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-141901, filed Aug. 31, 2021, which is hereby incorporated by reference herein in their entirety.

What is claimed is:

1. An electrophotographic cleaning blade comprising:

an elastic member containing a polyurethane; and a supporting member configured to support the elastic member, the electrophotographic cleaning blade being configured to clean a surface of a member to be cleaned, which is in motion, by bringing part of the elastic member into abutment with the surface of the member to be cleaned, the polyurethane having a structural unit represented by the following chemical formula (1):

Chemical formula (1)

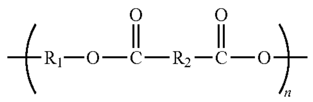

where, in the chemical formula (1), $R_1$ represents a linear divalent hydrocarbon group having 4 carbon atoms, $R_2$ represents a linear divalent hydrocarbon group having 6 carbon atoms and "n" is an integer of 1 or more, wherein when a side of the cleaning blade to be brought into abutment with the surface of the member to be cleaned is defined as a distal end side of the cleaning blade, the elastic member has a plate shape having a main surface facing the member to be cleaned, and a distal end surface forming a distal end-side edge with the main surface, at least on the distal end side, wherein, assuming that a first line segment is drawn on the distal end surface so that the first line segment is parallel to the distal end-side edge at a distance of 10 μm from the distal end-side edge, when:

a length of the first line segment is represented by L;

a point on the first line segment at a distance of ½L from one end side in a longitudinal direction of the elastic member is represented by P1;

a Martens hardness of the elastic member measured at the point P1 is represented by HM1; and a bisector of an angle formed by the main surface and the distal end surface is drawn on a cross-section of the elastic member orthogonal to the distal end surface including the point P1 and the distal end-side edge, and Martens hardness at positions on the bisector at intervals of 30 μm from the distal end-side edge to a position furthest away from the distal end-side edge by 100 μm, are measured, the Martens hardness at the respective positions decreases from the distal end-side edge to the position furthest away from the distal end-side edge by 100 μm, the HM1 is 1.0 $N/mm^2$ or more, and with regard to an index value Ko determined by the following equation (1) from a scattering profile obtained by allowing a characteristic X-ray from a Cu tube to enter a surface region to be evaluated of the cleaning blade including the point P1 at an incidence angle ω, $K\omega_1 > K\omega_2 > K\omega_3$ is satisfied, where $K\omega_1$ represents the index value at $\omega_1=0.5°$, $K\omega_2$ represents the index value at $\omega_2=1.0°$, and $K\omega_3$ represents the index value at $\omega_3=3.0°$:

$$K\omega=[I_c/(I_c+I_a)]\times 100 \quad (1)$$

where $I_c$ represents a peak area value at $2\theta=21.0°$ in the scattering profile, and $I_a$ represents a peak area value at $2\theta=20.2°$ in the scattering profile, and wherein the cleaning blade has an erosion rate E of 0.6 μm/g or less, which is measured on the surface region to be evaluated using spherical alumina particles having an average particle diameter (D50) of 3.0 μm.

2. The cleaning blade according to claim 1, wherein the HM1 is 1.0 to 5.0 $N/mm^2$.

3. The cleaning blade according to claim 1, wherein the polyurethane is a polyurethane having two or more kinds of structural units each represented by the chemical formula (1).

4. The cleaning blade according to claim 1, wherein M2/M1 is 0.0001 to 0.10000, where M1 represents a detection amount of all ions obtained when a sample sampled from the elastic member is heated to be vaporized in an ionization chamber, and is heated at a temperature increase rate of 10° C./see to 1,000° C. through use of a mass spectrometer of a direct sample introduction system involving ionizing a sample molecule, and M2 represents an integral intensity of a peak of an extracted ion thermogram corresponding to a range of an m/z value derived from the chemical formula (1), the m/z value being calculated by the calculation equation (2):

$$\{200+[14\times(x-4)+14\times(y-4)]+1\}\pm 0.5 \quad \text{Equation (2)}$$

"x" and "y" represent the respective carbon numbers of R1 and R2 in the chemical formula (1).

5. A process cartridge comprising an electrophotographic cleaning blade, the electrophotographic cleaning blade comprising:

an elastic member containing a polyurethane; and a supporting member configured to support the elastic member, the electrophotographic cleaning blade being configured to clean a surface of a member to be cleaned, which is in motion, by bringing part of the elastic member into abutment with the surface of the member to be cleaned, the polyurethane having a structural unit represented by the following chemical formula (1):

Chemical formula (1)

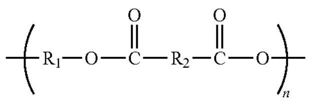

where, in the chemical formula (1), $R_1$ represents a linear divalent hydrocarbon group having 4 carbon atoms, $R_2$ represents a linear divalent hydrocarbon group having 6 carbon atoms and "n" is an integer of 1 or more, wherein when a side of the cleaning blade to be brought into abutment with the surface of the member to be cleaned is defined as a distal end side of the cleaning blade, the elastic member has a plate shape having a main surface facing the member to be cleaned, and a distal end surface forming a distal end-side edge with the main surface, at least on the distal end side, wherein, assuming that a first line segment is drawn on the distal end surface so that the first line segment is parallel to the distal end-side edge at a distance of 10 μm from the distal end-side edge, when:

a length of the first line segment is represented by L;

a point on the first line segment at a distance of ½L from one end side in a longitudinal direction of the elastic member is represented by P1;

a Martens hardness of the elastic member measured at a position of the point P1 is represented by HM1; and a bisector of an angle formed by the main surface and the distal end surface is drawn on a cross-section of the elastic member orthogonal to the distal end surface including the point P1 and the distal end-side edge, and Martens hardness at positions on the bisector at intervals of 30 μm from the distal end-side edge to a position furthest away from the distal end-side edge by 100 μm are measured, the Martens hardness at the respective positions decreases from the distal end-side edge to the position on furthest away from the distal end-side edge by 100 μm, the HM1 is 1.0 $N/mm^2$ or more, and with regard to an index value Ko determined by the following equation (1) from a scattering profile obtained by allowing a characteristic X-ray from a Cu tube to enter a surface region to be evaluated of the cleaning blade including the point P1 at an incidence angle ω, $K\omega_1 > K\omega_2 > K\omega_3$ is satisfied, where $K\omega_1$ represents the index value at $\omega_1 = 0.5°$, $K\omega_2$ represents the index value at $\omega_2 = 1.0°$, and $K\omega_3$ represents the index value at $\omega_3 = 3.0°$:

$$K\omega = [I_c/(I_c + I_a)] \times 100 \quad (1)$$

where $I_c$ represents a peak area value at 2θ=21.0° in the scattering profile, and $I_a$ represents a peak area value at 2θ=20.2° in the scattering profile, and wherein the cleaning blade has an erosion rate E of 0.6 μm/g or less, which is measured on the surface region to be evaluated using spherical alumina particles having an average particle diameter (D50) of 3.0 μm.

6. The process cartridge according to claim 5, further comprising a photosensitive member, wherein at least part of the elastic member of the cleaning blade is brought into abutment with the photosensitive member.

7. An electrophotographic image forming apparatus comprising an electrophotographic cleaning blade, the electrophotographic cleaning blade comprising:

an elastic member containing a polyurethane; and a supporting member configured to support the elastic member, the electrophotographic cleaning blade being configured to clean a surface of a member to be cleaned, which is in motion, by bringing part of the elastic member into abutment with the surface of the member to be cleaned, the polyurethane having a structural unit represented by the following chemical formula (1):

Chemical formula (1)

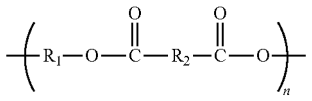

where, in the chemical formula (1), $R_1$ represents a linear divalent hydrocarbon group having 4 carbon atoms, $R_2$ represents a linear divalent hydrocarbon group having 6 carbon atoms, and "n" is an integer of 1 or more, wherein when a side of the cleaning blade to be brought into abutment with the surface of the member to be cleaned is defined as a distal end side of the cleaning blade, the elastic member has a plate shape having a main surface facing the member to be cleaned, and a distal end surface forming a distal end-side edge with the main surface, at least on the distal end side, wherein, assuming that a first line segment is drawn on the distal end surface so that the first line segment is parallel to the distal end-side edge at a distance of 10 μm from the distal end-side edge, when:

a length of the first line segment is represented by L;

a point on the first line segment at a distance of ½L from one end side in the longitudinal direction of the elastic member is represented by P1;

a Martens hardness of the elastic member measured at a position of the point P1 is represented by HM1; and a bisector of an angle formed by the main surface and the distal end surface is drawn on a cross-section of the elastic member orthogonal to the distal end surface including the point P1 and the distal end-side edge, and Martens hardness at positions on the bisector at intervals of 30 μm from the distal end-side edge to a position furthest away from the distal end-side edge by 100 μm are measured, the Martens hardness at the respective positions decreases from the distal end-side edge to the position furthest away from the distal end-side edge by 100 μm, the HM1 is 1.0 $N/mm^2$ or more, and with regard to an index value Ko determined by the following equation (1) from a scattering profile obtained by allowing a characteristic X-ray from a Cu tube to enter a surface region to be evaluated of the cleaning blade including the point P1 at an incidence angle ω, $K\omega_1 > K\omega_2 > K\omega_3$ is satisfied, where $K\omega_1$ represents the index value at $\omega_1 = 0.5°$, $K\omega_2$ represents the index value at $\omega_2 = 1.0°$, and $K\omega_3$ represents the index value at $\omega_3 = 3.0°$:

$$K\omega = [I_c/(I_c + I_a)] \times 100 \quad (1)$$

where $I_c$ represents a peak area value at $2\theta = 21.0°$ in the scattering profile, and $I_a$ represents a peak area value at $2\theta = 20.2°$ in the scattering profile, and wherein the cleaning blade has an erosion rate E of 0.6 μm/g or less, which is measured on the surface region to be evaluated using spherical alumina particles having an average particle diameter (D50) of 3.0 μm.

8. The electrophotographic image forming apparatus according to claim 7, further comprising an intermediate transfer belt, wherein at least part of the elastic member of the cleaning blade is brought into abutment with a surface of the intermediate transfer belt.

* * * * *